Figure 1:
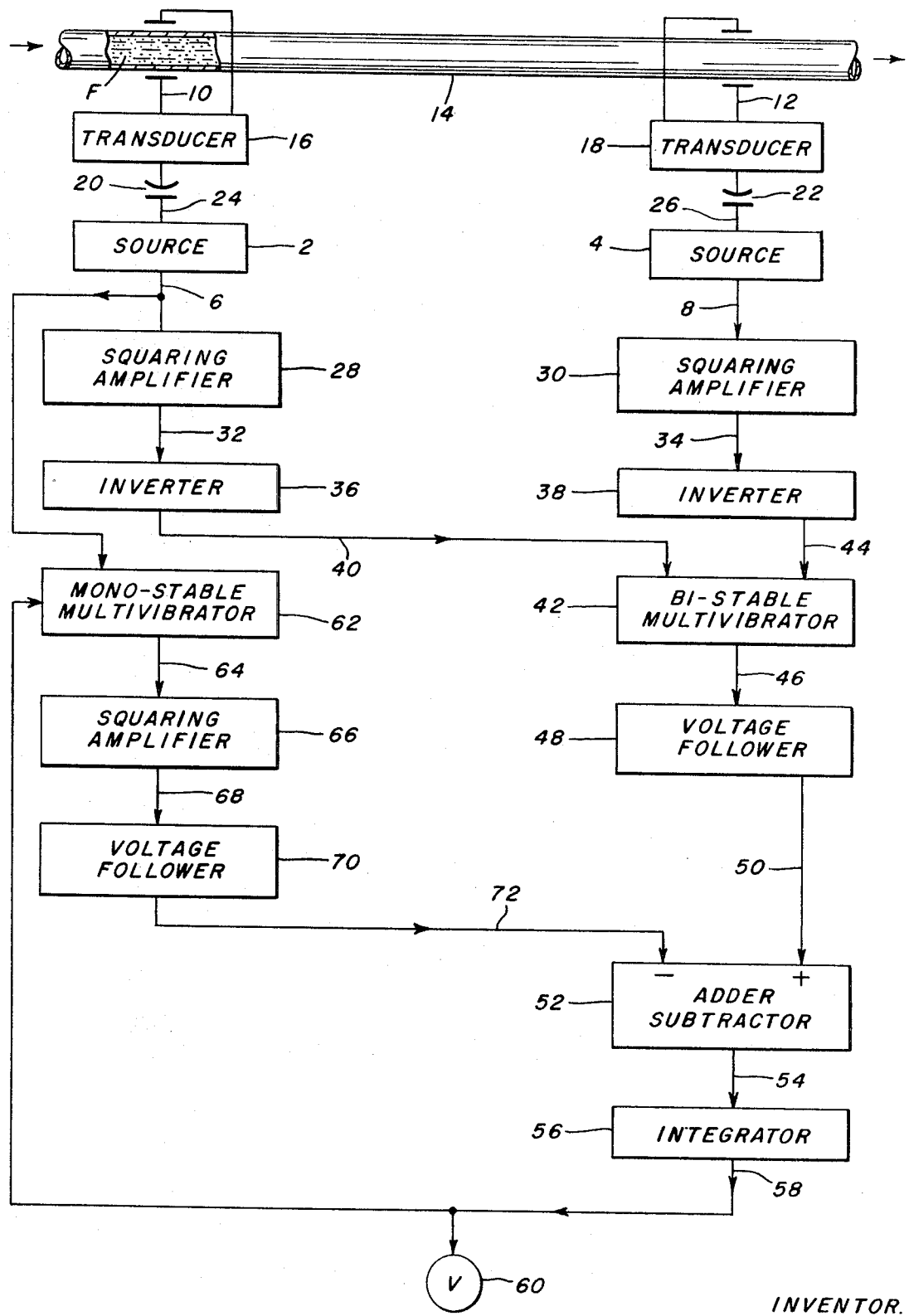

United States Patent

[11] 3,588,699

[72] Inventor Joseph Pysnik
 Monroeville, Pa.
[21] Appl. No. 792,935
[22] Filed Jan. 22, 1969
[45] Patented June 28, 1971
[73] Assignee United States Steel Corporation

[54] CIRCUIT FOR CONVERTING TIME DELAY TO VOLTAGE
 6 Claims, 2 Drawing Figs.
[52] U.S. Cl. .................................................. 324/189,
 73/194, 324/83, 328/133
[51] Int. Cl. .................................................. G04f 9/00
[50] Field of Search ......................................... 324/68, 83,
 88, 70, 78, 77 (Cursory); 328/133, 134; 307/232,
 295; 73/194, (I), (E), (Inquired)

[56] References Cited
UNITED STATES PATENTS
| 3,325,730 | 6/1967 | Des Brisay | 324/68 |
| 3,205,438 | 6/1965 | Buck | 328/133 |

Primary Examiner—Michael J. Lynch
Attorney—Rea C. Helm

ABSTRACT: A circuit for converting the time delay between two signals utilizes the first signal to turn on a monostable multivibrator and a bistable multivibrator. The second signal turns off the bistable multivibrator. The difference between the ON times is integrated and fed back to the monostable multivibrator reference input. This changes the monostable multivibrator output towards the level of the bistable multivibrator output. When equilibrium is reached the integrator output is a measure of the time difference between the two signals.

INVENTOR.
JOSEPH PYSNIK

CIRCUIT FOR CONVERTING TIME DELAY TO VOLTAGE

This invention relates to a circuit for providing a voltage related to the time delay or elapsed time between two correlated events.

One method of determining the velocity of a fluid in a stream is to measure the time required for radioactive tracers or medium density variations to pass two spaced apart sensors at fixed locations on the stream. This time is a measure of stream velocity. The time lapse can be measured with a high frequency oscillator and a counter. In order to provide a voltage related to velocity, the count is converted to a voltage and the reciprocal of the voltage obtained. This method requires so much elaborate equipment as to be undesirable.

According to my invention, a signal from an upstream sensor turns on a bistable multivibrator and a monostable multivibrator. A signal from a downstream sensor turns the bistable multivibrator off. The ON time of the monostable multivibrator is subtracted from the ON time of the bistable multivibrator by an adder-subtracter circuit. The difference, either negative or positive, is integrated and the integrator output fed back to the reference input of the monostable multivibrator. If the reference voltage increases, the subsequent ON time of the monostable multivibrator will decrease. If the reference voltage decreases, subsequent ON time will increase. If the input signals repeat with a constant time separation, the difference between the bistable multivibrator ON time and the monostable multivibrator ON time becomes smaller because of the feedback. The integrator output then reaches a point of equilibrium which will be maintained until a subsequent change in signal separation time occurs.

It is therefore an object of my invention to provide a circuit for converting the time between two correlated events into a voltage.

Another object is to provide such a circuit which develops a magnitude and direction correcting voltage from a first pair of correlated events to apply to a succeeding pair of correlated events.

Figure 2:
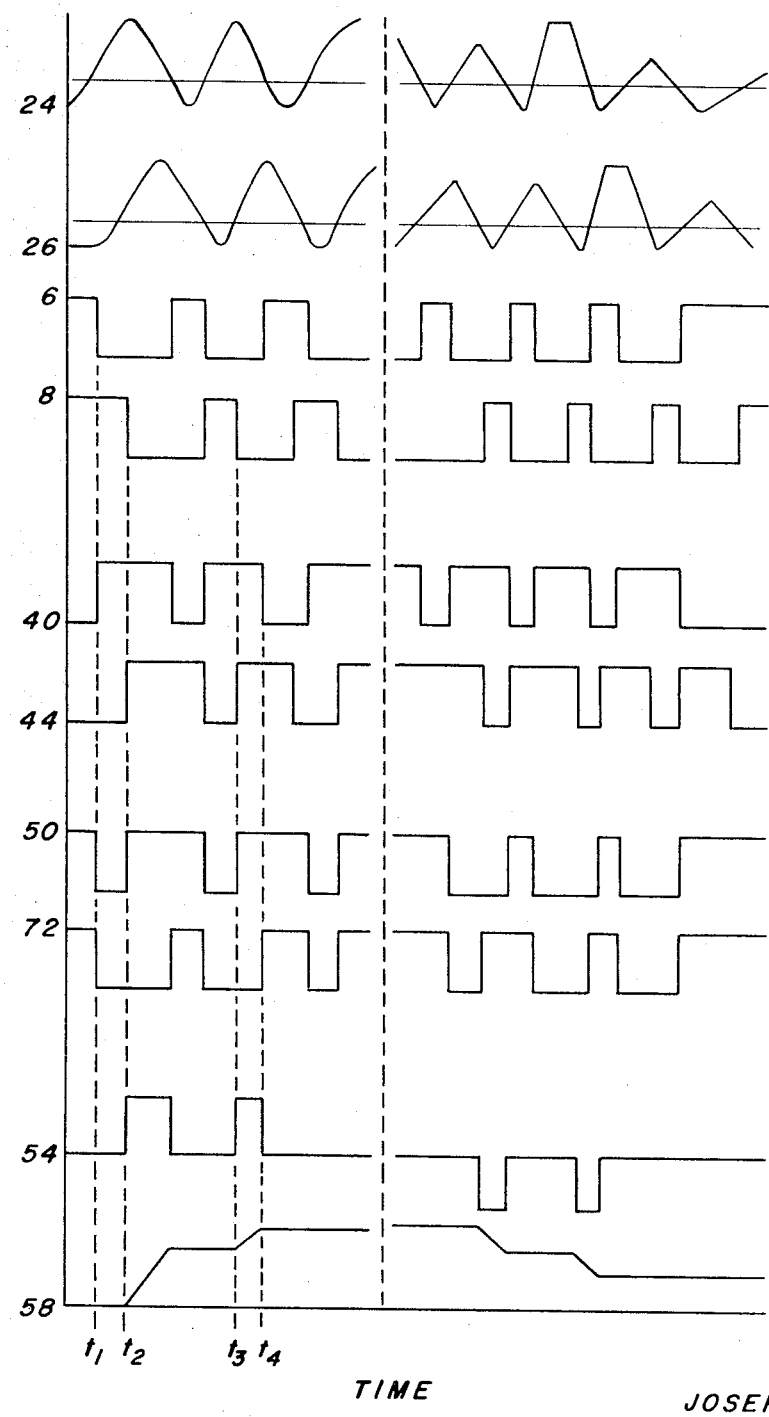

These and other objects will be more apparent after referring to the following specification and attached drawing in which:

FIG. 1 is a schematic diagram of the circuit of my invention used to determine velocity of material flowing through a conduit; and FIG. 2 is a diagram of voltage waveforms at selected locations in the circuit of my invention.

Referring more particularly to the drawing, reference numerals 2 and 4 indicate sources of two correlated time varying electrical signals 6 and 8.

Signals 6 and 8 may be any correlated waveforms such as sine, square, or triangular-shaped waveforms, or pulse trains separated by the time to be measure. However, my invention will be described with signals 6 and 8 as a series of negative going pulses used in fluid velocity measurement. Capacitors 10 and 12 detect density changes in a fluid F flowing through conduit 14. Transducers 16 and 18 convert the density changes to voltage changes, which, after passing through capacitors 20 and 22, respectively, become voltage waveforms 24 and 26. Voltage waveforms 24 and 26 are converted to waveforms 6 and 8, respectively, when sources 2 and 4 are comparators biased at a fixed voltage so that the comparators are essentially detecting zero crossovers of waveforms 24 and 26. Signals 6 and 8 are connected to squaring amplifiers 28 and 30, respectively, which may be a Model T-306, manufactured by the Engineered Electronics Corporation, 1441 E. Chestnut Avenue, Santa Ana, Calif. one of several components of my invention made by the same manufacturer which are hereinafter designated with the prefix Model T.

Outputs 32 and 34 of amplifier 28 and 30, respectively, are connected to inverters 36 and 38, respectively, which may each be one half of a Model T-136. Output 40 of inverter 36 is connected to an ON input of a bistable multivibrator 42 which may be a Model T-103. OUtput 44 of inverter 38 is connected to an OfF input of bistable multivibrator 42. ON output 46 of bistable multivibrator 42 is connected to a voltage follower 48 which may be a Model 19-105-1 manufactured by the Consolidated Electrodynamics Corporation, Devar Kinetics Division, 706 Bostwick Avenue, Bridgeport, Conn., one of several components of my invention made by the same manufacturer which are hereinafter designated with the prefix Model 19.

Output 50 of voltage follower 48 is connected to a positive input of an adder-subtracter 52 which may be a Model 19-30 1. Output 54 of adder-subtracter 52 is connected to an integrator 56 which may be a Model 19-407. Output 58 of integrator 56 is connected to a voltmeter 60, and also to a reference input of a monostable multivibrator 62. Multivibrator 62 may be the type described in Rudolph U.S. Pat. No. 3,539,934 entitled "Monostable Multivibrator Circuit with a Linear Voltage Controlled Pulse Width" dated Nov. 10, 1970, which provides an output pulse width which is proportional to a reference voltage. Signal 6 is also connected to a trigger input of multivibrator 62. Output 64 of monostable multivibrator 62 is connected to a squaring amplifier 66 which may be a Model T-306. Output 68 of squaring amplifier 66 is connected to an input of a voltage follower 70 which may be a Model 19-105-1. Output 72 from voltage follower 70 is connected to a negative input of adder-subtracter 50.

In operation, assume that negative going pulses 6 and 8 as shown in FIG. 2 are applied to amplifiers 28 and 30 from sources 2 and 4, respectively. The pulses are amplified and inverted to waveforms 40 and 44 at time $t_1$ indicated in FIG. 2. The positive going edge of waveform 40 turns multivibrator 42 on, starting the negative going edge to waveform 50. At time $t_2$, the positive going edge of waveform 44 turns multivibrator 42 off, thereby completing the negative pulse of waveform 50. The pulse width of waveform 50 is therefore proportional to the time delay between pulses of signals 6 and 8.

Signal 6 is also applied to the trigger input of monostable multivibrator 62 turning multivibrator 62 ON, thereby producing a negative going pulse waveform 72 which has a pulse width proportional to the voltage level of output 58 from integrator 56. Waveforms 50 and 72, when connected to adder-subtracter 52 produce a waveform 54 which is the difference between waveforms 50 and 72. Adder-subtracter 52 produces positive going pulses when waveform 72 has a pulse width longer than the pulse width of waveform 50 and a negative going pulse when waveform 72 has a pulse width smaller than the pulse width of waveform 50.

At time $t_2$, integrator 56 begins to provide an output voltage 58 which increases for the duration of the width of the pulse of waveform 54. This provides a new reference level voltage to multivibrator 62 for the next pulses received from sources 2 and 4 which in turn provides a second and shorter pulse in waveforms 54 from $t_3$ to $t_4$. This process continues with each set of pulses from sources 2 and 4 tending to make the pulse width of waveform 72 derived from multivibrator 62 equal to the pulse width of waveform 50 derived from multivibrator 42. When the two pulses are the same width, the voltage output 58 will be steady and its magnitude is a measure of the time difference between the pulses from sources 2 and 4.

The waveforms to the left of the broken line of FIG. 2 indicate the operation of the circuit when the flow of fluid F may be increasing or where voltage 58 at least initially is small enough that the pulse width of waveform 72 is greater than the pulse width of waveform 50. The waveforms to the right of the broken line in FIG. 2 indicate the waveforms in the circuit when the flow of the fluid F may be decreasing or where the voltage 58 at least initially is large enough so that the pulse width of waveform 72 is less than the pulse width of waveform 50. Waveform 54 not only shows the magnitude of the correction to be made, but also the direction of the correction.

The squaring amplifiers, voltage followers and inverters are only used to condition the waveforms for use by components having different input requirements. This circuit produces a voltage directly related to the velocity of a fluid as measured by the fluid density changes passing between two stations.

While one embodiment of my invention has been shown and described, it will be apparent that other adaptations and modifications may be made.

I claim:

1. A circuit for converting a time delay to an output voltage comprising first means for providing two correlated waveforms separated by the time delay which is to be converted to the output voltage, second means responsive to a pair of correlated variations in said waveforms and connected to said first means for providing said waveforms for providing a first pulse having a width directly proportional to the time between said pair of variations, third means responsive to the first occurring one of the pair of correlated variations and connected to said first means for providing a second pulse, said second pulse having a width representative of a reference input voltage connected to said third means, fourth means connected to both said second and third means and responsive to the pulses from each pair of correlated variations for providing said output voltage whose value is representative of the difference in pulse width between said pulses, and fifth means connecting said output voltage as said reference input voltage to said third means thereby tending to change the width of the next succeeding pulse from said third means to equal the width of the pulse from said second means.

2. A circuit according to claim 1 in which the second means is a bistable multivibrator and the third means is a monostable multivibrator.

3. A circuit according to claim 2 in which said monostable multivibrator has a pulse width proportional to said reference voltage.

4. A circuit according to claim 1 in which said fourth means includes an adder-subtractor providing a voltage output pulse having a width representative of the difference between the pulse widths of each pair of correlated pulses from said second and third means, and sixth means connected to said adder-subtractor for integrating successive pulses from said adder-subtractor.

5. A circuit according to claim 4 in which said voltage output pulses vary in width and polarity.

6. A circuit according to claim 4 including means to display the output of said sixth means.